US012487888B2

(12) United States Patent
Arun

(10) Patent No.: US 12,487,888 B2
(45) Date of Patent: Dec. 2, 2025

(54) FILE SYSTEM CHANGED BLOCK TRACKING FOR DATA PLATFORMS

(71) Applicant: Cohesity, Inc., San Jose, CA (US)

(72) Inventor: Anand Arun, Santa Clara, CA (US)

(73) Assignee: Cohesity, Inc., Santa Clara, CA (US)

( * ) Notice: Subject to any disclaimer, the term of this patent is extended or adjusted under 35 U.S.C. 154(b) by 0 days.

(21) Appl. No.: 18/497,718

(22) Filed: Oct. 30, 2023

(65) Prior Publication Data

US 2025/0138947 A1 May 1, 2025

(51) Int. Cl.
*G06F 16/00* (2019.01)
*G06F 11/14* (2006.01)
*G06F 16/11* (2019.01)

(52) U.S. Cl.
CPC ...... *G06F 11/1451* (2013.01); *G06F 11/1461* (2013.01); *G06F 16/122* (2019.01); *G06F 2201/84* (2013.01)

(58) Field of Classification Search
None
See application file for complete search history.

(56) References Cited

U.S. PATENT DOCUMENTS

| | | | |
|---|---|---|---|
| 9,619,172 B1 * | 4/2017 | Natanzon | G06F 3/0689 |
| 9,678,685 B1 | 6/2017 | Coffing et al. | |
| 9,690,666 B1 * | 6/2017 | Shembavnekar ... | G06F 11/1451 |
| 10,146,630 B1 * | 12/2018 | Kumar | G06F 16/2237 |
| 11,803,308 B2 * | 10/2023 | Bhagi | G06F 3/0619 |
| 2016/0147607 A1 * | 5/2016 | Dornemann | G06F 3/067 711/162 |
| 2017/0004047 A1 * | 1/2017 | Deshmukh | G06F 11/1448 |
| 2018/0039434 A1 * | 2/2018 | Balcha | G06F 3/0665 |
| 2020/0026777 A1 * | 1/2020 | Luo | G06F 11/1464 |
| 2020/0104202 A1 * | 4/2020 | Stupak | G06F 16/119 |
| 2021/0026810 A1 * | 1/2021 | Gaonkar | G06F 16/2246 |
| 2021/0049079 A1 * | 2/2021 | Kumar | G06F 11/1484 |
| 2021/0382633 A1 * | 12/2021 | Bhagi | G06F 16/178 |
| 2022/0197518 A1 * | 6/2022 | Bhagi | G06F 3/0644 |
| 2023/0205636 A1 | 6/2023 | Yadav et al. | |

OTHER PUBLICATIONS

Extended Search Report from counterpart European Application No. 24179972.5 dated Dec. 5, 2024, 9 pp.

* cited by examiner

*Primary Examiner* — Farhan M Syed
(74) *Attorney, Agent, or Firm* — Shumaker & Sieffert, P.A.

(57) ABSTRACT

A computing device comprising a storage device and processing circuitry may perform the techniques of this disclosure. The storage device may have a plurality of blocks forming a volume. The processing circuitry may obtain volume changed block tracking (CBT) information identifying one or more of the blocks storing updated data that has changed relative to a previous backup of the one or more blocks, and determine file mapping information identifying one or more blocks of the plurality of blocks that store file data associated with a file. The processing circuitry may also determine, based on the volume CBT information and the file mapping information, file system CBT information identifying whether at least one of the one or more blocks store file data associated with the file have changed, and initiate, based on the file system CBT information, a subsequent backup of at least a portion of the file data.

16 Claims, 7 Drawing Sheets

FILE SYSTEM CHANGED BLOCK TRACKING FOR DATA PLATFORMS

TECHNICAL FIELD

This disclosure relates to data platforms for computing systems.

BACKGROUND

Data platforms that support computing applications rely on primary storage systems to support latency sensitive applications. However, because primary storage is often more difficult or expensive to scale, a secondary storage system is often relied upon to support secondary use cases such as backup and archive.

SUMMARY

Aspects of this disclosure include techniques for file system (FS) changed block tracking (CBT) for data platforms. Data platforms often integrate with application systems to backup data stored to storage devices of the application system. In some instances, the data platform or an operator may install an agent on the application system, where the agent is responsible for managing backup of data stored to the storage devices, as well as coordinate other operations associated with the data platform. The primary system may not natively support volume level CBT in which blocks associated with a volume defined within the storage device are tracked in order to facilitate subsequent backups, where only changed blocks are backed up for the volume rather than backing up all of the blocks forming the particular volume. CBT in general may promote more efficient backup that reduces consumption of computing resources compared to full backup of entire volumes.

In some instances, FS CBT may be employed to facilitate only backing up particular files stored to a given volume. That is, FS CBT may allow the agent to identify changes to blocks storing file data associated with the particular files (which may be user defined), thereby eliminating the need, when volume level CBT is not enabled, to backup blocks for an entire volume. Alternatively, volume level CBT may be employed along with FS CBT, where FS CBT may facilitate file-level backup at different frequencies compared to volume level CBT or according to various other different backup parameters. Employing both volume level CBT and FS CBT may therefore allow for general volume-level backup of entire volumes at longer frequencies (e.g., daily, weekly, monthly, etc.) and file level backup at shorter frequencies (e.g., hourly, daily, weekly, etc.). As such, users may configure volume level backup and file level backup to accommodate many different contexts and data management goals.

However, performing FS CBT to enable file level backup with sufficient reliability may become an issue given that many file systems detachment are difficult to predict during reboots of servers of the application system (e.g., to accommodate performance degradation of the application system, installation of patches or other updates, power outages, scheduled downtime for maintenance, etc.). That is, during a reboot, the operating system executed by a server of the application system may detach the file system while writes are still pending, which may prevent the agent from performing reliable FS CBT given that the file system is no longer available. The operating system may perform the writes by internally issuing the writes to the underlying volume, but the agent is unable to accurately document file level changes to the blocks storing file data for the particular files. Without the ability to accurately track changes to the blocks, the agent resorts to performing a full scan of the volume after recovering from the reboot to determine whether the file data of the particular files have changed, which may consume significant computing resources of the application systems and the data protection systems, which may possibly result in a degraded user experience.

Various aspects of the techniques described in this disclosure may enable the agent to leverage volume level CBT to perform FS CBT (which may also be referred to as a file system level incremental backup) in a more reliable manner, given that volumes are not detached until much later in the reboot process (e.g., until after all pending writes have been successfully performed). Volume level CBT may therefore track all changes to blocks forming the volume more reliably. The agent may interface with the file system to identify file mapping information identifying which blocks in the volume store file data associated with the particular files subject to file level backup. The agent may next identify, based on the intersection of volume level CBT and the file mapping information, FS CBT information identifying whether at least one of the blocks forming the volume store file data associated with the particular files have changed. The agent may then initiate a subsequent file level backup based on the file system changed block information.

The techniques may provide one or more technical advantages that realize a practical application. For example, the techniques may allow for more reliable FS CBT that is potentially resilient to reboots without having to expend significant computing resources to reconstruct FS CBT information using a full scan of each block forming the files relative to each block of the previous backup of the files. As such, various aspects of the techniques may improve operation of the application system itself in terms of reducing consumption of computing resources (e.g., processor cycles, memory, memory bus bandwidth, and associated power) and network resources (e.g., network bandwidth) compared to standard FS CBT. Such reduction in computing resources may further improve the computing experience as reboots may not take as long, and data access requests may improve in terms of timeliness (given that memory bus bandwidth is limited and performing a full scan of a volume may consume much if not all of the memory bus bandwidth), which may also improve the user experience.

In one example, this disclosure describes a method comprising: obtaining, by processing circuitry of a computing device, volume changed block tracking information identifying one or more blocks of a plurality of blocks forming a volume of a storage device storing updated data that has changed relative to a previous backup of the one or more blocks of the plurality of blocks forming the volume; determining, by the processing circuitry, file mapping information identifying one or more blocks of the plurality of blocks forming the volume store file data associated with a file; determining, by the processing circuitry and based on the volume changed block tracking information and the file mapping information, file system changed block information indicating whether at least one of the one or more blocks of the plurality of blocks forming the volume store file data associated with the file have changed; and initiating, by the processing circuitry and based on the file system changed block information, a subsequent backup of at least a portion of the file data associated with the file.

In another example, this disclosure describes a computing device comprising: a storage device having a plurality of blocks forming a volume; and processing circuitry having access to the storage device and configured to: obtain volume changed block tracking information identifying one or more blocks of the plurality of blocks forming the volume storing updated data that has changed relative to a previous backup of the one or more blocks of the plurality of blocks forming the volume; determine file mapping information identifying one or more blocks of the plurality of blocks forming the volume store file data associated with a file; determine, based on the volume changed block tracking information and the file mapping information, file system changed block information identifying whether at least one of the one or more blocks of the plurality of blocks forming the volume store file data associated with the file have changed; and initiate, based on the file system changed block information, a subsequent backup of at least a portion of the file data associated with the file.

In another example, this disclosure describes a computer-readable storage medium comprising instructions that, when executed, configure processing circuitry of a computing system to: obtain volume changed block tracking information identifying one or more blocks of a plurality of blocks forming a volume storing updated data that has changed relative to a previous backup of the one or more blocks of the plurality of blocks forming the volume; determine file mapping information identifying one or more blocks of the plurality of blocks forming the volume store file data associated with a file; determine, based on the volume changed block tracking information and the file mapping information, file system changed block information identifying whether at least one of the one or more blocks of the plurality of blocks forming the volume store file data associated with the file have changed; and initiate, based on the file system changed block information, a subsequent backup of at least a portion of the file data associated with the file.

BRIEF DESCRIPTION OF THE DRAWINGS

Like reference characters denote like elements throughout the text and figures.

DETAILED DESCRIPTION

Figure 1A:
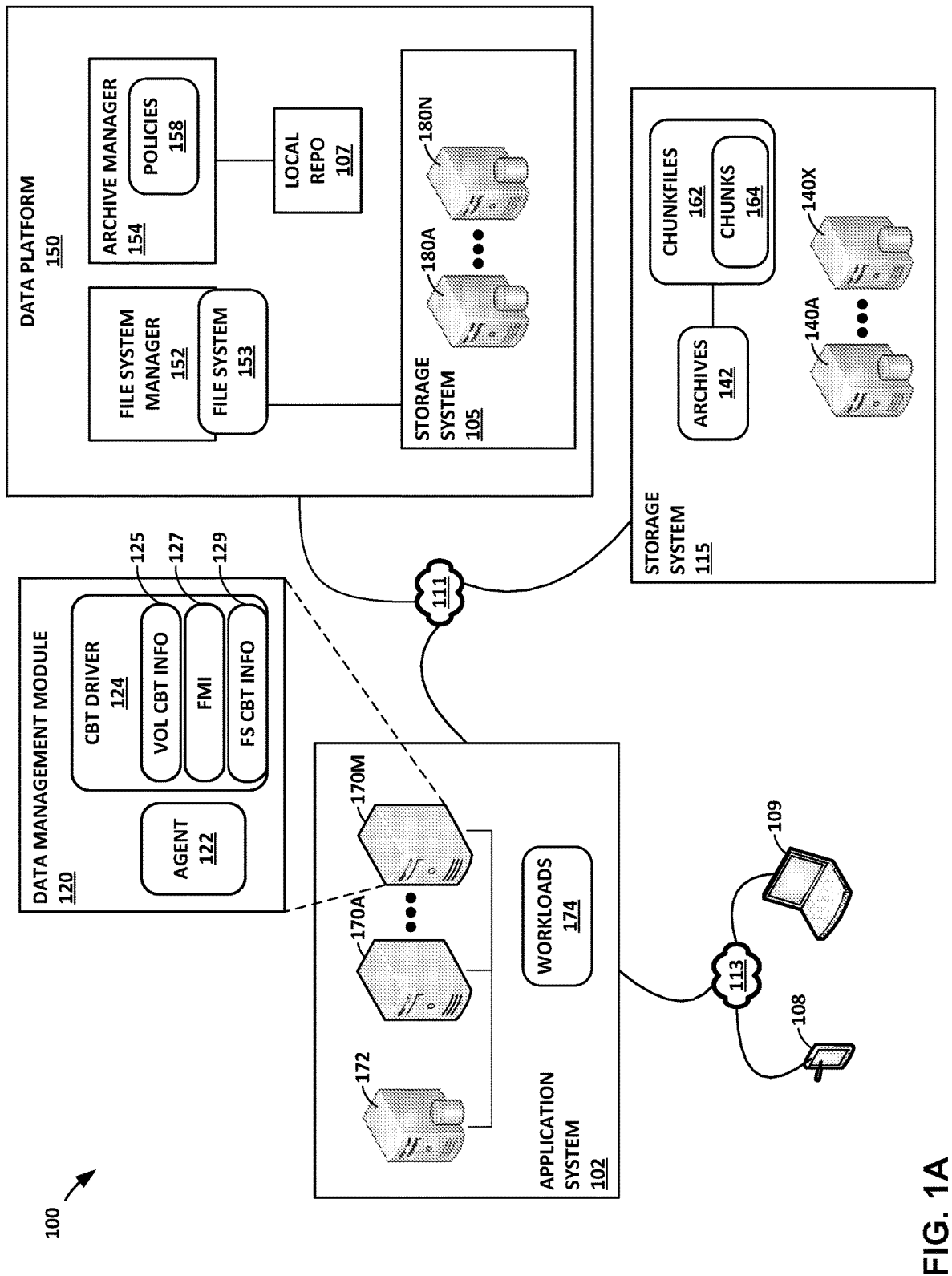
FIGS. 1A-1B are block diagrams illustrating example systems that perform file system block change tracking, in accordance with one or more aspects of the present disclosure.
Figure 1B:
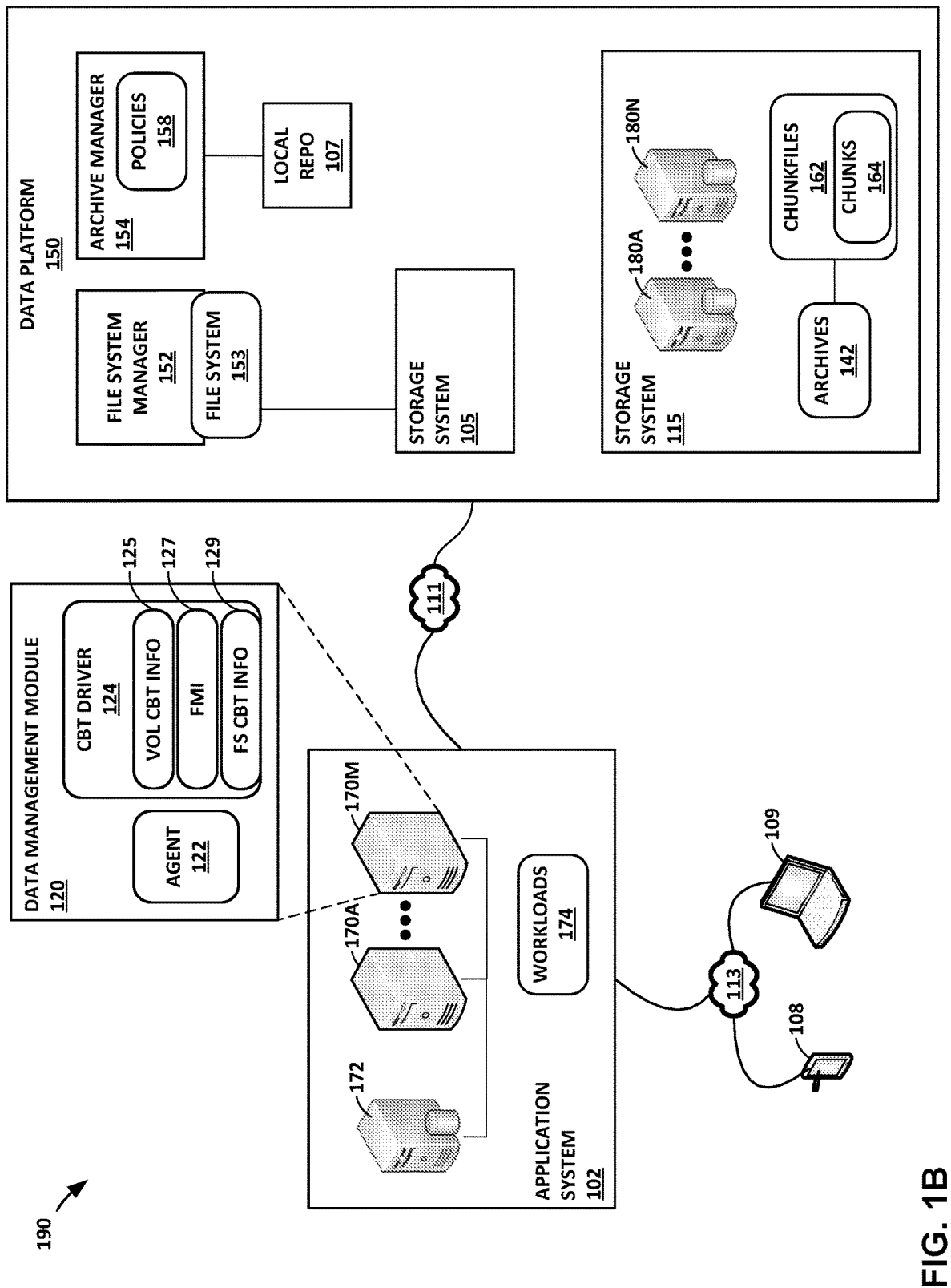

FIGS. 1A-1B are block diagrams illustrating example systems that perform file system block change tracking, in accordance with one or more aspects of the present disclosure. In the example of FIG. 1A, system 100 includes application system 102. Application system 102 represents a collection of hardware devices, software components, and/or data stores that can be used to implement one or more applications or services provided to one or more mobile devices 108 and one or more client devices 109 via a network 113. Application system 102 may include one or more physical or virtual computing devices that execute workloads 174 for the applications or services. Workloads 174 may include one or more virtual machines, containers, Kubernetes pods each including one or more containers, bare metal processes, and/or other types of workloads.

In the example of FIG. 1A, application system 102 includes application servers 170A-170M (collectively, "application servers 170") connected via a network with database server 172 implementing a database. Other examples of application system 102 may include one or more load balancers, web servers, network devices such as switches or gateways, or other devices for implementing and delivering one or more applications or services to mobile devices 108 and client devices 109. Application system 102 may include one or more file servers. The one or more file servers may implement a primary file system for application system 102. (In such instances, file system 153 may be a secondary file system that provides backup, archive, and/or other services for the primary file system. Reference herein to a file system may include a primary file system or secondary file system, e.g., a primary file system for application system 102 or file system 153 operating as either a primary file system or a secondary file system.)

Application system 102 may be located on premises and/or in one or more data centers, with each data center a part of a public, private, or hybrid cloud. The applications or services may be distributed applications. The applications or services may support enterprise software, financial software, office or other productivity software, data analysis software, customer relationship management, web services, educational software, database software, multimedia software, information technology, health care software, or other type of applications or services. The applications or services may be provided as a service (-aaS) for Software-aaS (SaaS), Platform-aaS (PaaS), Infrastructure-aaS (IaaS), Data Storage-aaS (DSaaS), or other type of service.

In some examples, application system 102 may represent an enterprise system that includes one or more workstations in the form of desktop computers, laptop computers, mobile devices, enterprise servers, network devices, and other hardware to support enterprise applications. Enterprise applications may include enterprise software, financial software, office or other productivity software, data analysis software, customer relationship management, web services, educational software, database software, multimedia software, information technology, health care software, or other type of applications. Enterprise applications may be delivered as a service from external cloud service providers or other providers, executed natively on application system 102, or both.

In the example of FIG. 1A, system 100 includes a data platform 150 that provides a file system 153 and archival functions to an application system 102, using storage system 105 and separate storage system 115. Data platform 150 implements a distributed file system 153 and a storage architecture to facilitate access by application system 102 to file system data and to facilitate the transfer of data between storage system 105 and application system 102 via network 111. With the distributed file system, data platform 150 enables devices of application system 102 to access file system data, via network 111 using a communication protocol, as if such file system data was stored locally (e.g., to a hard disk of a device of application system 102). Example communication protocols for accessing files and objects include Server Message Block (SMB), Network File System (NFS), or AMAZON Simple Storage Service (S3). File system 153 may be a primary file system or secondary file system for application system 102.

File system manager 152 represents a collection of hardware devices and software components that implements file system 153 for data platform 150. Examples of file system functions provided by the file system manager 152 include storage space management including deduplication, file naming, directory management, metadata management, partitioning, and access control. File system manager 152 executes a communication protocol to facilitate access via network 111 by application system 102 to files and objects stored to storage system 105.

Data platform 150 includes storage system 105 having one or more storage devices 180A-180N (collectively, "storage devices 180"). Storage devices 180 may represent one or more physical or virtual compute and/or storage devices that include or otherwise have access to storage media. Such storage media may include one or more of Flash drives, solid state drives (SSDs), hard disk drives (HDDs), forms of electrically programmable memories (EPROM) or electrically erasable and programmable (EEPROM) memories, and/or other types of storage media used to support data platform 150. Different storage devices of storage devices 180 may have a different mix of types of storage media. Each of storage devices 180 may include system memory. Each of storage devices 180 may be a storage server, a network-attached storage (NAS) device, or may represent disk storage for a compute device. Storage system 105 may be a redundant array of independent disks (RAID) system. In some examples, one or more of storage devices 180 are both compute and storage devices that execute software for data platform 150, such as file system manager 152 and archive manager 154 in the example of system 100, and store objects and metadata for data platform 150 to storage media. In some examples, separate compute devices (not shown) execute software for data platform 150, such as file system manager 152 and archive manager 154 in the example of system 100. Each of storage devices 180 may be considered and referred to as a "storage node" or simply as a "node". Storage devices 180 may represent virtual machines running on a supported hypervisor, a cloud virtual machine, a physical rack server, or a compute node installed in a converged platform.

In various examples, data platform 150 runs on physical systems, virtually, or natively in the cloud. For instance, data platform 150 may be deployed as a physical cluster, a virtual cluster, or a cloud-based cluster running in a private, hybrid private/public, or public cloud deployed by a cloud service provider. In some examples of system 100, multiple instances of data platform 150 may be deployed, and file system 153 may be replicated among the various instances. In some cases, data platform 150 is a compute cluster that represents a single management domain. The number of storage devices 180 may be scaled to meet performance needs.

Data platform 150 may implement and offer multiple storage domains to one or more tenants or to segregate workloads 174 that require different data policies. A storage domain is a data policy domain that determines policies for deduplication, compression, encryption, tiering, and other operations performed with respect to objects stored using the storage domain. In this way, data platform 150 may offer users the flexibility to choose global data policies or workload specific data policies. Data platform 150 may support partitioning.

A view is a protocol export that resides within a storage domain. A view inherits data policies from its storage domain, though additional data policies may be specified for the view. Views can be exported via SMB, NFS, S3, and/or another communication protocol. Policies that determine data processing and storage by data platform 150 may be assigned at the view level. A protection policy may specify a backup frequency and a retention policy, which may include a data lock period. Archives 142 or snapshots created in accordance with a protection policy inherit the data lock period and retention period specified by the protection policy.

Each of network 113 and network 111 may be the internet or may include or represent any public or private communications network or other network. For instance, network 113 may be a cellular, Wi-Fi®, ZigBee®, Bluetooth®, Near-Field Communication (NFC), satellite, enterprise, service provider, and/or other type of network enabling transfer of data between computing systems, servers, computing devices, and/or storage devices. One or more of such devices may transmit and receive data, commands, control signals, and/or other information across network 113 or network 111 using any suitable communication techniques. Each of network 113 or network 111 may include one or more network hubs, network switches, network routers, satellite dishes, or any other network equipment. Such network devices or components may be operatively inter-coupled, thereby providing for the exchange of information between computers, devices, or other components (e.g., between one or more client devices or systems and one or more computer/server/storage devices or systems). Each of the devices or systems illustrated in FIGS. 1A-1B may be operatively coupled to network 113 and/or network 111 using one or more network links. The links coupling such devices or systems to network 113 and/or network 111 may be Ethernet, Asynchronous Transfer Mode (ATM) or other types of network connections, and such connections may be wireless and/or wired connections. One or more of the devices or systems illustrated in FIGS. 1A-1B or otherwise on network 113 and/or network 111 may be in a remote location relative to one or more other illustrated devices or systems.

Application system 102, using file system 153 provided by data platform 150, generates objects and other data that file system manager 152 creates, manages, and causes to be stored to storage system 105. For this reason, application system 102 may alternatively be referred to as a "source system," and file system 153 for application system 102 may alternatively be referred to as a "source file system." Application system 102 may for some purposes communicate directly with storage system 105 via network 111 to transfer objects, and for some purposes communicate with file system manager 152 via network 111 to obtain objects or metadata indirectly from storage system 105. File system manager 152 generates and stores metadata to storage system 105. The collection of data stored to storage system 105 and used to implement file system 153 is referred to herein as file system data. File system data may include the aforementioned metadata and objects. Metadata may include file system objects, tables, trees, or other data structures; metadata generated to support deduplication; or metadata to support snapshots. Objects that are stored may include files, virtual machines, databases, applications, pods, container, any of workloads 174, system images, directory information, or other types of objects used by application system 102. Objects of different types and objects of a same type may be deduplicated with respect to one another.

Data platform 150 includes archive manager 154 that provides archiving of file system data for file system 153. In the example of system 100, archive manager 154 archives file system data, stored by storage system 105, to storage system 115 via network 111.

Storage system 115 includes one or more storage devices 140A-140X (collectively, "storage devices 140"). Storage devices 140 may represent one or more physical or virtual compute and/or storage devices that include or otherwise have access to storage media. Such storage media may include one or more of Flash drives, solid state drives (SSDs), hard disk drives (HDDs), optical discs, forms of electrically programmable memories (EPROM) or electrically erasable and programmable (EEPROM) memories, and/or other types of storage media. Different storage devices of storage devices 140 may have a different mix of types of storage media. Each of storage devices 140 may include system memory. Each of storage devices 140 may be a storage server, a network-attached storage (NAS) device, or may represent disk storage for a compute device. Storage system 115 may include redundant array of independent disks (RAID) system. Storage system 115 may be capable of storing much larger amounts of data than storage system 105. Storage devices 140 may further be configured for long-term storage of information more suitable for archival purposes.

In some examples, storage system 105 and/or 115 may be a storage system deployed and managed by a cloud storage provider and referred to as a "cloud storage system." Example cloud storage providers include, e.g., AMAZON WEB SERVICES (AWS™) by AMAZON, INC., AZURE® by MICROSOFT, INC., DROPBOX™ by DROPBOX, INC., ORACLE CLOUD™ by ORACLE, INC., and GOOGLE CLOUD PLATFORM (GCP) by GOOGLE, INC.

In some examples, storage system 115 is co-located with storage system 105 in a data center, on-prem, or in a private, public, or hybrid private/public cloud. Storage system 115 may be considered a "backup" or "secondary" storage system for primary storage system 105. Storage system 115 may be referred to as an "external target" for archives 142. Where deployed and managed by a cloud storage provider, storage system 115 may be referred to as "cloud storage." Storage system 115 may include one or more interfaces for managing transfer of data between storage system 105 and storage system 115 and/or between application system 102 and storage system 115. Data platform 150 that supports application system 102 relies on primary storage system 105 to support latency sensitive applications. However, because storage system 105 is often more difficult or expensive to scale, data platform 150 may use secondary storage system 115 to support secondary use cases such as backup and archive. In general, a file system backup is a copy of file system 153 to support protecting file system 153 for quick recovery, often due to some data loss in file system 153, and a file system archive ("archive") is a copy of file system 153 to support longer term retention and review. The "copy" of file system 153 may include such data as is needed to restore or view file system 153 in its state at the time of the backup or archive.

Archive manager 154 may archive file system data for file system 153 at any time in accordance with archive policies that specify, for example, archive periodicity and timing (daily, weekly, etc.), which file system data is to be archived, an archive retention period, storage location, access control, and so forth. An initial archive of file system data corresponds to a state of the file system data at an initial archive time (the archive creation time of the initial archive). The initial archive may include a full archive of the file system data or may include less than a full archive of the file system data, in accordance with archive policies. For example, the initial archive may include all objects of file system 153 or one or more selected objects of file system 153.

One or more subsequent incremental archives of the file system 153 may correspond to respective states of the file system 153 at respective subsequent archive creation times, i.e., after the archive creation time corresponding to the initial archive. A subsequent archive may include an incremental archive of file system 153. A subsequent archive may correspond to an incremental archive of one or more objects of file system 153. Some of the file system data for file system 153 stored on storage system 105 at the initial archive creation time may also be stored on storage system 105 at the subsequent archive creation times. A subsequent incremental archive may include data that was not previously archived to storage system 115. File system data that is included in a subsequent archive may be deduplicated by archive manager 154 against file system data that is included in one or more previous archives, including the initial archive, to reduce the amount of storage used. (Reference to a "time" in this disclosure may refer to dates and/or times. Times may be associated with dates. Multiple archives may occur at different times on the same date, for instance.)

In system 100, archive manager 154 archives file system data to storage system 115 as archives 142, using chunkfiles 162. Archive manager 154 may use any of archives 142 to subsequently restore the file system (or portion thereof) to its state at the archive creation time, or the archive may be used to create or present a new file system (or "view") based on the archive, for instance. As noted above, archive manager 154 may deduplicate file system data included in a subsequent archive against file system data that is included in one or more previous archives. For example, a second object of file system 153 and included in a second archive may be deduplicated against a first object of file system 153 and included in a first, earlier archive. Archive manager 154 may remove a data chunk ("chunk") of the second object and generate metadata with a reference (e.g., a pointer) to a stored chunk of chunks 164 in one of chunkfiles 162. The stored chunk in this example is an instance of a chunk stored for the first object.

Archive manager 154 may apply deduplication as part of a write process of writing (i.e., storing) an object of file system 153 to one of archives 142 in storage system 115. Deduplication may be implemented in various ways. For example, the approach may be fixed length or variable length, the block size for the file system may be fixed or variable, and deduplication domains may be applied globally or by workload. Fixed length deduplication involves delimiting data streams at fixed intervals. Variable length deduplication involves delimiting data streams at variable intervals to improve the ability to match data, regardless of the file system block size approach being used. This algorithm is more complex than a fixed length deduplication algorithm but can be more effective for most situations and generally produces less metadata. Variable length deduplication may include variable length, sliding window deduplication. The length of any deduplication operation (whether fixed length or variable length) determines the size of the chunk being deduplicated.

In some examples, the chunk size can be within a fixed range for variable length deduplication. For instance, archive manager 154 can compute chunks having chunk sizes within the range of 16-48 KB. Archive manager 154 may eschew deduplication for objects that that are less than 16 kB. In some example implementations, when data of an object is being considered for deduplication, archive manager 154 compares a chunk identifier (ID) (e.g., a hash value of the entire chunk) of the data to existing chunk IDs for already stored chunks. If a match is found, archive manager 154 updates metadata for the object to point to the matching, already stored chunk. If no matching chunk is found, archive manager 154 writes the data of the object to storage as one of chunks 164 for one of chunkfiles 162. Archive manager 154 additionally stores the chunk ID in chunk metadata, in association with the new stored chunk, to allow for future deduplication against the new stored chunk. In general, chunk metadata is usable for generating, viewing, retrieving, or restoring objects stored as chunks 164 (and references thereto) within chunkfiles 162, for any of archives 142, and is described in further detail below.

Each of chunkfiles 162 includes multiple chunks 164. Chunkfiles 162 may be fixed size (e.g., 8 MB) or variable size. Chunkfiles 162 may be stored using a data structure offered by a cloud storage provider for storage system 115. For example, each of chunkfiles 162 may be one of an S3 object within an AWS cloud bucket, an object within AZURE Blob Storage, an object in Object Storage for ORACLE CLOUD, or other similar data structure used within another cloud storage provider storage system. Any of chunkfiles 162 may be subject to a write once, ready many (WORM) lock having a WORM lock expiration time. A WORM lock for an S3 object is known as an "object lock" and a WORM lock for an object within AZURE Blob Storage is known as "blob immutability."

The process of deduplication for multiple objects over multiple archives results in chunkfiles 162 that each have multiple chunks 164 for multiple different objects associated with the multiple archives. In some examples, different archives 142 may have objects that are effectively copies of the same data, e.g., for an object of the file system that has not been modified. An object of an archive may be represented or "stored" as metadata having references to chunks that enable the archived object to be accessed. Accordingly, description herein to an archive "storing," "having," or "including" an object includes instances in which the archive does not store the data for the object in its native form.

The initial archive and the one or more subsequent incremental archives of archives 142 may each be associated with a corresponding retention period and, in some cases, a data lock period for the archive. As described above, a data management policy (not shown) may specify a retention period for an archive and a data lock period for an archive. A retention period for an archive is the amount of time for which the archive and the chunks that objects of the archive reference are to be stored before the archive and the chunks are eligible to be removed from storage. The retention period for the archive begins when the archive is stored (the archive creation time). A chunkfile containing chunks that objects of an archive reference and that are subject to a retention period of the archive, but not subject to a data lock period for the archive, may be modified at any time prior to expiration of the retention period. The nature of such a modification must be such to preserve the data referenced by objects of the archive.

A user or application associated with application system 102 may have access (e.g., read or write) to archived data that is stored in storage system 115. The user or application may delete some of the data due to a malicious attack (e.g., virus, ransomware, etc.), a rogue or malicious administrator, and/or human error. The user's credentials may be compromised and as a result, the archived data that is stored in storage system 115 may be subject to ransomware. To reduce the likelihood of accidental or malicious data deletion or corruption, a data lock having a data lock period may be applied to an archive.

As described above, chunkfiles 162 may represent an object in an archive storage system (shown as "storage system 115," which may also be referred to as "archive storage system 115") that conform to an underlying architecture of archive storage system 115. Data platform 150 includes archive manager 154 that supports archiving of data in the form of chunkfiles 162, which interface with archive storage system 115 to store chunkfiles 162 after forming chunkfiles 162 from one or more chunks 164 of data. Archive manager 154 may apply a process referred to as "deduplication" with respect to chunks 164 to remove redundant chunks and generate metadata linking redundant chunks to previously archived chunks 164 and thereby reduce storage consumed (and thereby reduce storage costs in terms of storage required to store the chunks). Archive manager 154 may aggregate chunks 164 with metadata to form chunkfile 162 at archive storage system 115.

As further shown in the example of FIG. 1A, application system 102 may execute data management module 120. In this example, application server 170M is shown as executing data management module 120, although any one or more of database server 172 and/or application servers 170 (as well as additional servers, computing devices, etc. not shown in the example of FIG. 1A) may execute corresponding instances of data management module 120.

Data management module 120 may represent software (or hardware or a combination of both) for managing data stored locally to application system 102, e.g., by database server 172 and/or application servers 170, where data management module 120 may interface with data platform 150 to remotely store data (e.g., backups) by way of storage system 105 or archive data to storage system 115. Data management module 120 may include an agent 122, which may act on behalf of data platform 150 to coordinate backup and/or archive of data stored locally at application system 102. Agent 122 may interface with data platform 150 via network 111 to coordinate delivery of data for backup, provide metadata specific to the data for backup (e.g., type of data, duration of archive, periodicity of archive, amount of data, etc.), and otherwise assist in coordinating operations of data platform 150 with respect to application system 102.

Data management module 120 may also include one or more changed block tracking (CBT) drivers 124 that intercept input/output control ("IOCTL") operations sent to underlying storage devices for purposes of data operations, such as reads, writes, deletes, copy (which is a read followed by a write), etc. CBT driver 124 may process these requests to identify whether data stored locally to application system 102 has been updated since a previous backup of the local data. CBT driver 124 may track these "changes" in order to identify whether or not the local data needs to be included in a subsequent backup.

By way of data management module 120, data platform 150 may, in other words, integrate with application system 102 to backup storage devices of servers of application system 102. As noted above, agent 122 is responsible for managing backup of data stored to the storage devices as well as coordinate other operations associated with data platform 150. Application system 150 may not natively support volume level CBT in which blocks associated with a volume defined within the storage device are tracked in order to facilitate subsequent backups, where only changed blocks are backed up for the volume rather than backing up all of the blocks forming the particular volume. CBT in general may promote more efficient backup that reduces consumption of computing resources (e.g., processing cycles, memory, memory bus bandwidth and associated power) compared to full backup of entire volumes.

In some instances, file system (FS) CBT may be employed to facilitate only backing up particular files stored to a given volume. That is, FS CBT may allow agent 122, by way of CBT driver 124, to identify changes to blocks storing file data associated with the particular files (which may be user defined), thereby eliminating the need, when volume level CBT is not enabled, to backup blocks for an entire volume. Alternatively, volume level CBT may be employed along with FS CBT, where FS CBT may facilitate file-level backup at different frequencies compared to volume level CBT or according to various other different backup parameters. Employing both volume level CBT and FS CBT may therefore allow for general volume-level backup of entire volumes at longer frequencies (e.g., daily, weekly, monthly, etc.) and file level backup at shorter frequencies (e.g., hourly, twice daily, daily, weekly, etc.). As such, users may configure volume level backup and file level backup to accommodate many different contexts and data management goals.

However, performing FS CBT to enable file level backup with sufficient reliability may become an issue given that many file system detachment are difficult to predict during reboots of application server 170M (e.g., to accommodate performance degradation of application server 170M, installation of patches or other updates, power outages, scheduled downtime for maintenance, etc.). That is, during a reboot, the operating system executed by application system 170M may detach the file system while writes are still pending, which may prevent CBT driver 124 (as well as agent 122) from performing reliable FS CBT given that the file system is no longer available. The operating system may perform the writes, but CBT driver 124 is unable to accurately document file level changes to the blocks storing file data for the particular files. Without the ability to accurately track changes to the blocks, agent 122 (by way of CBT driver 124) resorts to performing a full scan of the volume after recovering from the reboot to determine whether the file data of the particular files have changed, which may consume significant computing resources of the application systems and possibly result in a degraded user experience.

Various aspects of the techniques described in this disclosure may enable CBT driver 124 to leverage volume level CBT to perform FS CBT in a more reliable manner, given that volumes are not detached until much later in the reboot process (e.g., until after all pending writes have been successfully performed). Volume level CBT may therefore track all changes to blocks forming the volume more reliably in the form of volume CBT information 125 ("vol CBT info 125"). CBT driver 124 may interface with the file system of the underlying operating system executed by application server 170M to identify file mapping information 127 ("FMI 127") identifying which blocks in the volume store file data associated with the particular files subject to file level backup. CBT driver 124 may next identify, based on the intersection of volume level CBT information 125 and file mapping information 127, FS CBT information 129 ("FS CBT info 129") identifying whether at least one of the blocks forming the volume store file data associated with the particular files have changed. Agent 122 may then initiate a subsequent file level backup based on FS CBT information 129.

The techniques may provide one or more technical advantages that realize a practical application. For example, the techniques may allow for more reliable FS CBT that is potentially resilient to reboots without having to expend significant computing resources to reconstruct FS CBT information 129 using a full scan of each block forming the volume relative to each block of the previous backup of the volume. As such, various aspects of the techniques may improve operation of application server 170M itself in terms of reducing consumption of computing resources (e.g., processor cycles, memory, memory bus bandwidth, and associated power) compared to standard FS CBT. Such reduction in computing resources may further improve the computing experience as reboots may not take as long, and data access requests may improve in terms of timeliness (given that memory bus bandwidth is limited and performing a full scan of a volume may consume much if not all of the memory bus bandwidth), which may also improve the user experience.

In this respect, data management module 120 may obtain volume changed block tracking information 125 identifying one or more blocks of a plurality of blocks forming a volume stored to a storage device coupled to application server 170M store updated data that has changed relative to a previous backup of the one or more blocks of the plurality of blocks forming the volume. Data management module 120 may next identify a file stored to the volume for which changed block tracking is to be performed, and determine file mapping information 125 identifying one or more blocks of the plurality of blocks forming the volume store file data associated with the file. Data management module 120 may then determine, based on volume changed block tracking information 125 and file mapping information 127, file system changed block information 129 identifying whether at least one of the one or more blocks of the plurality of blocks forming the volume store file data associated with the file have changed. Data management module 120 may initiate, based on file system changed block information 129, a subsequent backup of at least a portion of the file data associated with the file.

System 190 of FIG. 1B is a variation of system 100 of FIG. 1A in that data platform 150 stores archives 142 using chunkfiles 162 stored to archive storage system 115 that resides on premises or, in other words, local to data platform 150. In some examples of system 190, storage system 115 enables users or applications to create, modify, or delete chunkfiles 162 via file system manager 152. In system 190, storage system 105 of FIG. 1B is the local storage system used by archive manager 154 for initially storing and accumulating chunks prior to archive to storage system 115.

Figure 2:
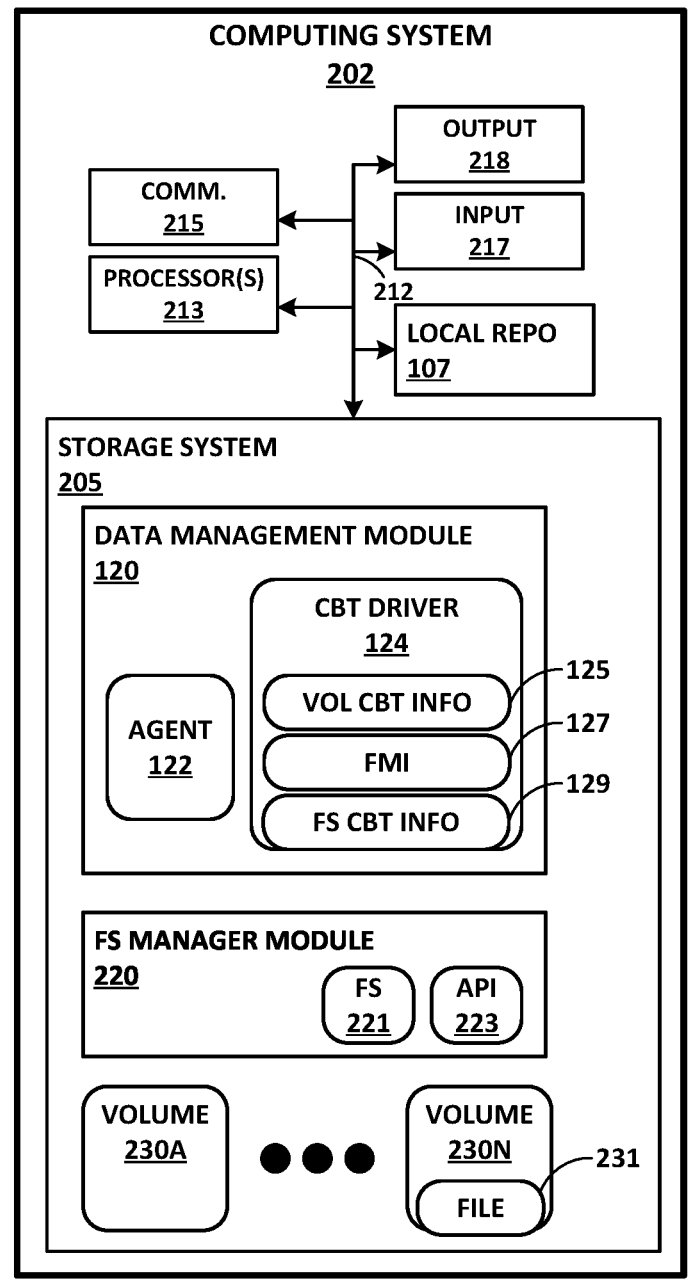
FIG. 2 is a block diagram illustrating example system, in accordance with techniques of this disclosure.

FIG. 2 is a block diagram illustrating example an application server, in accordance with techniques of this disclosure. Computing system 202 of FIG. 2 may represent an example of any one of application servers 170 and/or database servers 172 and may be described in the context of system 100 of FIG. 1A or system 190 of FIG. 1B.

In the example of FIG. 2, computing system 202 may be implemented as any suitable computing system, such as one or more server computers, workstations, mainframes, appliances, cloud computing systems, and/or other computing systems that may be capable of performing operations and/or functions described in accordance with one or more aspects of the present disclosure. In some examples, computing system 202 represents a cloud computing system, server farm, and/or server cluster (or portion thereof) that provides services to other devices or systems. In other examples, computing system 202 may represent or be implemented through one or more virtualized compute instances (e.g., virtual machines, containers) of a cloud computing system, server farm, data center, and/or server cluster.

In the example of FIG. 2, computing system 202 may include one or more communication units 215, one or more input devices 217, one or more output devices 218, and one or more storage devices of local storage system 205 ("storage system 205"). Local storage system 205 stores data management module 120 and file system (FS) manager module 220 ("FS manager module 220) along with presenting volumes 230A-230N ("volumes 230"). One or more of the devices, modules, storage areas, or other components of computing system 202 may be interconnected to enable inter-component communications (physically, communicatively, and/or operatively). In some examples, such connectivity may be provided through communication channels (e.g., communication channels 212), which may represent one or more of a system bus, a network connection, an inter-process communication data structure, or any other method for communicating data.

One or more processors 213 of computing system 202 may implement functionality and/or execute instructions associated with computing system 202 or associated with one or more modules illustrated in FIG. 2 and described below. One or more processors 213 may be, may be part of, and/or may include processing circuitry that performs operations in accordance with one or more aspects of the present disclosure. Examples of processors 213 include microprocessors, application processors, display controllers, auxiliary processors, one or more sensor hubs, and any other hardware configured to function as a processor, a processing unit, or a processing device. Computing system 202 may use one or more processors 213 to perform operations in accordance with one or more aspects of the present disclosure using software, hardware, firmware, or a mixture of hardware, software, and firmware residing in and/or executing at computing system 202.

One or more communication units 215 of computing system 202 may communicate with devices external to computing system 202 by transmitting and/or receiving data, and may operate, in some respects, as both an input device and an output device. In some examples, communication units 215 may communicate with other devices over a network. In other examples, communication units 215 may send and/or receive radio signals on a radio network such as a cellular radio network. In other examples, communication units 215 of computing system 202 may transmit and/or receive satellite signals on a satellite network. Examples of communication units 215 include a network interface card (e.g., such as an Ethernet card), an optical transceiver, a radio frequency transceiver, a GPS receiver, or any other type of device that can send and/or receive information. Other examples of communication units 215 may include devices capable of communicating over Bluetooth®, GPS, NFC, ZigBee®, and cellular networks (e.g., 3G, 4G, 5G), and Wi-Fi® radios found in mobile devices as well as Universal Serial Bus (USB) controllers and the like. Such communications may adhere to, implement, or abide by appropriate protocols, including Transmission Control Protocol/Internet Protocol (TCP/IP), Ethernet, Bluetooth®, NFC, or other technologies or protocols.

One or more input devices 217 may represent any input devices of computing system 202 not otherwise separately described herein. Input devices 217 may generate, receive, and/or process input. For example, one or more input devices 217 may generate or receive input from a network, a user input device, or any other type of device for detecting input from a human or machine.

One or more output devices 218 may represent any output devices of computing system 202 not otherwise separately described herein. Output devices 218 may generate, present, and/or process output. For example, one or more output devices 218 may generate, present, and/or process output in any form. Output devices 218 may include one or more USB interfaces, video and/or audio output interfaces, or any other type of device capable of generating tactile, audio, visual, video, electrical, or other output. Some devices may serve as both input and output devices. For example, a communication device may both send and receive data to and from other systems or devices over a network.

One or more storage devices of local storage system 205 within computing system 202 may store information for processing during operation of computing system 202, such as random access memory (RAM), Flash memory, solid-state disks (SSDs), hard disk drives (HDDs), etc., Storage devices may store program instructions and/or data associated with one or more of the modules described in accordance with one or more aspects of this disclosure. One or more processors 213 and one or more storage devices may provide an operating environment or platform for such modules, which may be implemented as software, but may in some examples include any combination of hardware, firmware, and software. One or more processors 213 may execute instructions and one or more storage devices of storage system 205 may store instructions and/or data of one or more modules. The combination of processors 213 and local storage system 205 may retrieve, store, and/or execute the instructions and/or data of one or more applications, modules, or software. Processors 213 and/or storage devices of local storage system 205 may also be operably coupled to one or more other software and/or hardware components, including, but not limited to, one or more of the components of computing system 202 and/or one or more devices or systems illustrated as being connected to computing system 202.

File system manager module 220 (which may also be referred to as "file system manager 220," or "FS manager 220") may perform functions relating to providing a file system (FS) 221 ("FS 221"). File system manager 220 may generate and manage file system metadata for structuring file system data for file system 221, and store file system metadata and file system data 230 to local storage system 205 (over one or more of volumes 230). File system metadata may include one or more trees that describe objects within file system 221 and a hierarchy of file system 221, and can be used to write or retrieve objects within file system 221. File system manager 221 may interact with and/or operate in conjunction with one or more modules of computing system 202, including data management module 120. Examples of file system 221 may include New Technology File System (NFTS), Resilient File System (ReFS), File Allocation Table (FAT), exFAT, or other suitable file system.

Data management module 120 may perform archive functions relating to backing up file system 221 (e.g., portions or all of file system 221). Data management module 120 may generate one or more backups of file system 221 that are stored to storage system 105 of data platform 150.

Data management module 120 may include a local agent 122 (shown as "agent 122") that executes locally within computing system 202. Agent 122 may operate as an agent of data platform 150 for purposes of coordinating archives 142 locally with respect to computing system 202, as well as performing various other operations to facilitate compact data transmission of updates to archive 142 (e.g., performing deduplication, compression, encoding, etc.), secure transmission (e.g., encryption), etc.

Data management module 120 may also include a CBT driver 124 configured to perform different levels of CBT (e.g., volume level CBT and FS level CBT). CBT driver 124 may be a single driver 124 positioned later in the reboot process (so as to perform volume CBT). As such, CBT driver 124 may implement volume CBT (or, in some instances, rely on the underlying storage system 205 itself, where certain storage devices may implement volume CBT themselves to generate volume CBT information 125) in order to leverage volume CBT information 125 to construct more reliable FS CBT information 129.

Agent 122 may interface with data platform 150 to configure (or reconfigure) CBT driver 124 when installing and/or executing data management module 120. Agent 122 may initialize and configure (or reconfigure) CBT driver 124 to obtain volume CBT information 125, which in the example of FIG. 2 is assumed to apply to volume 230N that stores file 231. As noted above, storage system 205 may include storage devices (e.g., Flash memory) that store volume 230N, where the storage devices natively support volume CBT. CBT driver 124 may be configured to retrieve volume CBT information 125 from the storage device itself.

When the underlying storage devices presenting volume 230N do not natively support volume CBT, CBT driver 124 may be configured to perform volume CBT in order to obtain volume CBT information 125. Volume CBT information 125 may include a volume CBT bitmap, where each bit in the bitmap identifies whether a corresponding block (which may be referred to as a "sector" for a volume) of the plurality blocks forming volume 230N has changed relative to a previous backup of the one or more blocks of the plurality of blocks forming volume 230N. CBT driver 124 may, after performing a backup of any blocks that changed relative to a previous backup, may clear the bitmap to indicate that all blocks have not changed relative to this now previous backup.

In any event, CBT driver 124 may, in order to generate FS CBT information 129, interface with FS manager 220 via application programming interface (API) 223 to obtain file mapping information (FMI) 127 ("FMI 127"). That is, FS manager 220 may expose or otherwise present API 223, which CBT driver 124 may be configured to invoke in order to determine FMI 127. While described with respect to API 223, FS manager 220 may present various FS tools that also enable determination of FMI 127.

FMI 127 may identify one or more blocks of the plurality of blocks forming volume 230N that store file data associated with file 231. The blocks that store the file data associated with file 231 may be contiguous or fragmented. FMI 127 may specify whether a particular file, e.g., file 231, subject to FS CBT exists within the volume block construct.

FMI 127 may, in some instances, include a file mapping bitmap that maps file data associated with file 231 to one or more blocks of the plurality of blocks forming volume 230N.

In some examples, CBT driver 124 may perform a translation of paths by which to access file 231, as files may have a number of different paths (e.g., direct paths, shortcuts, other hard/soft links, etc.), to obtain a common filename. CBT driver 124 may then interface with FS manager 220 via API 223, passing the common filename to FS manager 220. FS manager 220 may then output FMI 127 (or some derivative thereof, such as file layout information, that CBT driver 124 may process to obtain FMI 127, e.g., in the bitmap format discussed above).

CBT driver 124 may also, in some instances, interface with FS manager module 220 via API 223 to provide FMI 127 with respect to backups to maintain data consistency (so that when querying the file layout information-which may form part of FMI 127, the file layout is not changing or the file content does not change when reading data from the file, etc.). That is, given that current version of file system 221 may have changed in terms of hierarchy, file location, defragmentation, etc. data consistency may not be maintained and CBT driver 124 may request, via API 223, that FS manager 220 outputs FMI 127 with respect to the previous backup of FS 221 (where FS 221 may represent the previous backup of FS 221).

CBT driver 124 may determine, based on volume CBT information 125 and FMI 127, FS CBT information 129. CBT driver 124 may, as one example, intersect volume CBT information 125 with FMI 127 to derive changed blocks of volume 230N storing file data associated with file 231 (which is subject to FS CBT). Agent 122 may receive, via a user input, an indication identifying file 231 stored to volume 230N for which changed block tracking is to be performed, and configure (or reconfigure) CBT driver 124 to perform the above FS CBT with respect to file 231 by way of leveraging the more reliable volume CBT information 125. At some point, agent 122 may initiate, based on FS CBT information 129, a subsequent backup of at least a portion of the file data associated with file 231.

Figure 3:
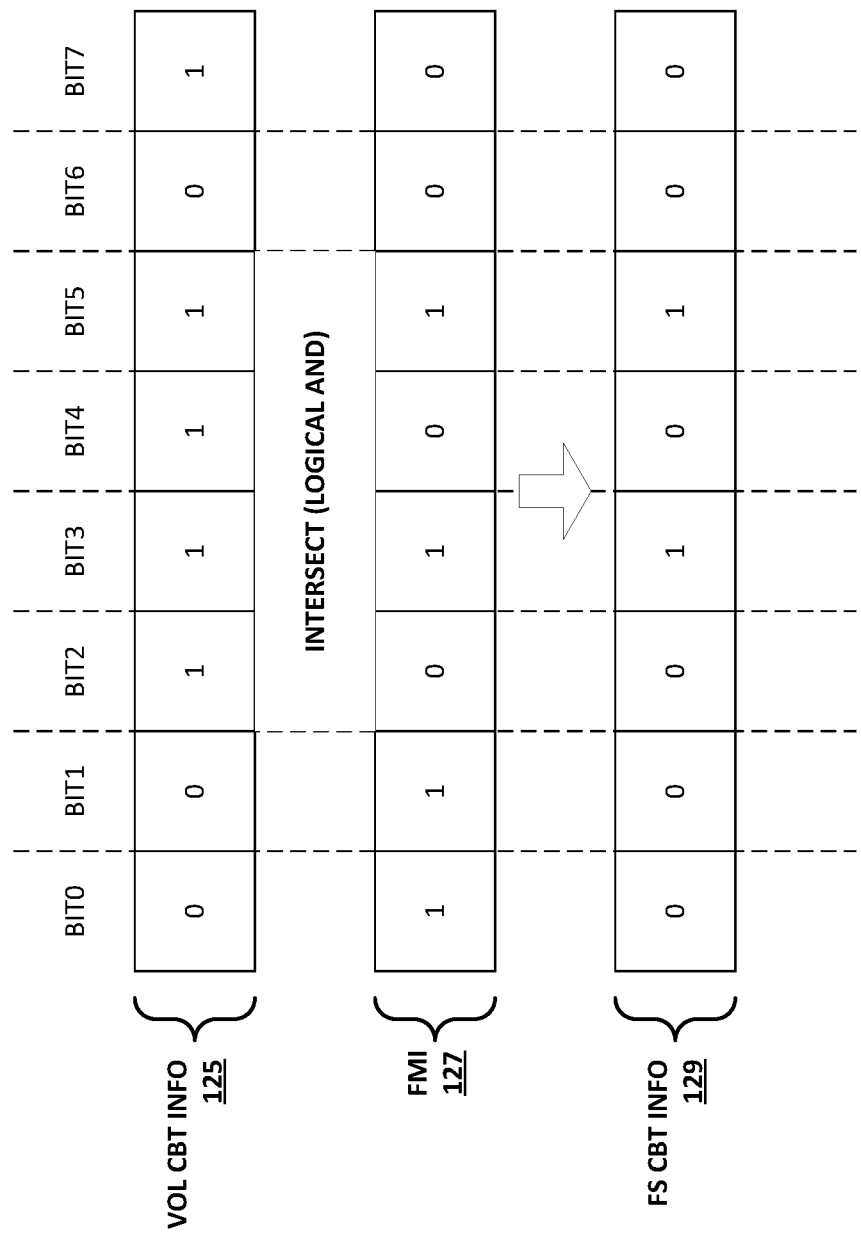
FIG. 3 is a conceptual diagram illustrating example operation of changed block tracking (CBT) driver shown in the examples of FIGS. 1A-2 in performing file system CBT in a manner that leverages volume CBT in accordance with various aspects of the techniques described in this disclosure.

FIG. 3 is a conceptual diagram illustrating example operation of changed block tracking (CBT) driver shown in the examples of FIGS. 1A-2 in performing file system CBT in a manner that leverages volume CBT in accordance with various aspects of the techniques described in this disclosure. In the example of FIG. 3, CBT driver 124 may obtain or, in some instances, determining volume CBT info 125 and FMI 127 (each as a bitmap, which has been shortened in length to eight (8) bits to facilitate the discussion herein, but each of which may be of any length).

CBT driver 124 may next determine, based on the volume CBT bitmap 125 (which is another way of referring to volume CBT information 125) and file mapping bitmap 127 (which is another way of referring to FMI 127), FS CBT information 129 identifying whether at least one of the one or more blocks of the plurality of blocks forming volume 230N (shown in the example of FIG. 2) store file data associated with file 231 have changed. CBT driver 124 may determine FS CBT information 129 (again, as a bitmap and hence may also be referred to as "FS CBT bitmap 129") as an intersection (e.g., a logical AND operation) of volume CBT bitmap 125 and file mapping bitmap 127.

As shown in the example of FIG. 3, volume CBT bitmap 125 has 8-bits with each bit corresponding to a different block of volume 230N. Volume CBT bitmap 125 includes a first bit (bit0) with a value of zero (0) denoting that a first block of volume 230N has not changed relative to the previous backup of volume 230N, a second bit (bit1) with a value of zero (0) denoting a directly adjacent block to the block corresponding to bit0 has not changed relative to the previous backup of volume 230N, a third bit (bit2) with a value of one (1) denoting that a block directly adjacent to the block corresponding to bit1 has changed relative to the previous backup of volume 230N, etc.

File mapping bitmap 127 is structured similarly to volume CBT bitmap 125, but each bit denotes whether a particular block of volume 230N stores file data associated with file 231. In the example of FIG. 3, file mapping bitmap 127 may include a first bit (bit0) having a value of one (1) denoting that the first block of volume 230N stores file data associated with file 231. Each of the second bit (bit1), forth bit (bit3), and sixth bit (bit5) of file mapping bitmap 127 have a value of one (1) thereby denoting that the second, forth, and sixths blocks of volume 230N store file data associated with file 231. The third bit (bit2), fifth bit (bit 4), seventh bit (bit6), and eight bit (bit7) of file mapping bitmap 127 have a value of zero (0) denoting that the third, fifth, seventh, and eighth blocks of volume 230N do not store file data associated with file 231.

CBT driver 124 may thereby obtain FS CBT bitmap 129 as a bitwise logical AND volume CBT bitmap 125 and file mapping bitmap 127 (where bitwise may denote that the logical AND is performed with respect to each bit individually between volume CBT bitmap 125 and file mapping bitmap 127 to produce each corresponding bit of FS CBT bitmap 129). The result of this bitwise logical AND operation may produce FS CBT bitmap 129 having values of one for various bits only when both corresponding bits of volume CBT bitmap 125 and file mapping bitmap 127 have a value of one (1).

This bitwise logical AND operation may produce FS CBT bitmap 129 with values of zero (0) for bits0-2, bit4, bit6, and bit7, and with values of one (1) for bit3 and bit5. Each bit of FS CBT bitmap 129 with a value of zero (0) indicates that either no file data is stored to the corresponding block in volume 230N or that the block possibly stores file data associated with file 231 but such file data has not changed. Each bit of FS CBT bitmap 129 with a value of one (1) indicates that the corresponding block of volume 230N both stores file data associated with file 231 and that such file data has changed. In this respect, CBT driver 124 may leverage volume CBT bitmap 125 along with file mapping bitmap 127 to effectively recreate FS CBT bitmap 129 in a potentially more reliable and efficient manner (even across reboots).

Figure 4:
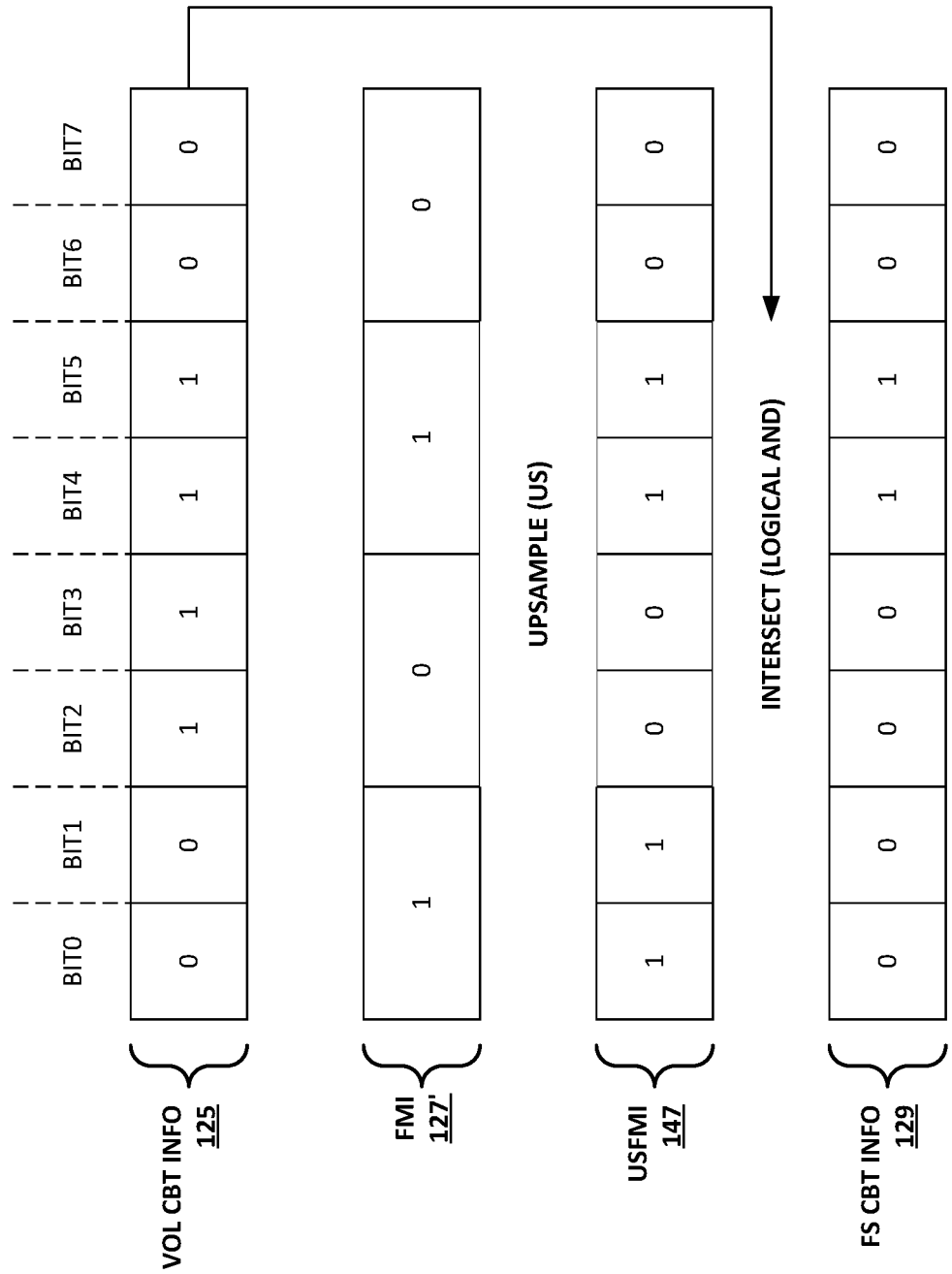
FIG. 4 is a conceptual diagram also illustrating example operation of changed block tracking (CBT) driver shown in the examples of FIGS. 1A-2 in performing file system CBT in a manner that leverages volume CBT in accordance with various aspects of the techniques described in this disclosure.

FIG. 4 is a conceptual diagram also illustrating example operation of changed block tracking (CBT) driver shown in the examples of FIGS. 1A-2 in performing file system CBT in a manner that leverages volume CBT in accordance with various aspects of the techniques described in this disclosure. Similar to the example described above with respect to FIG. 3, CBT driver 124 may obtain volume CBT bitmap 125 and file mapping bitmap 127', except file mapping bitmap 127' is different than file mapping bitmap 127 in that file mapping bitmap 127' is defined in a different (lower) granularity than file mapping bitmap 127.

In general, the granularity of any given file mapping bitmap is dependent upon the underlying file structure, which may define its block size as an integer multiple of the underlying sector size of the volume. In the example of FIG. 3, this integer multiple was assumed to be one (1) such that each block size for the file system is effectively equal to the underlying sector for the volume (where sectors refer to blocks of the volume). In the example of FIG. 4, this integer multiple is assumed to be two (2), where each file system block (which may be referred to as a "cohort") consumes two blocks (or, in other words, sectors) of the volume.

Given that volume CBT bitmap 125 has a higher granularity than file mapping bitmap 127' (where the prime (') notation denotes a differing granularity from that shown in the example of FIG. 3), CBT driver 124 may upsample (US) file mapping bitmap 127' to produce upsampled (US) file mapping bitmap 147 (which may also be referred to as upsampled (US) file mapping information (FMI) 147—USFMI 147) having the same granularity of volume CBT bitmap 125. CBT driver 124 may obtain FS CBT bitmap 129 as a bitwise logical AND of volume CBT bitmap 125 and US file mapping bitmap 147.

Figure 5:
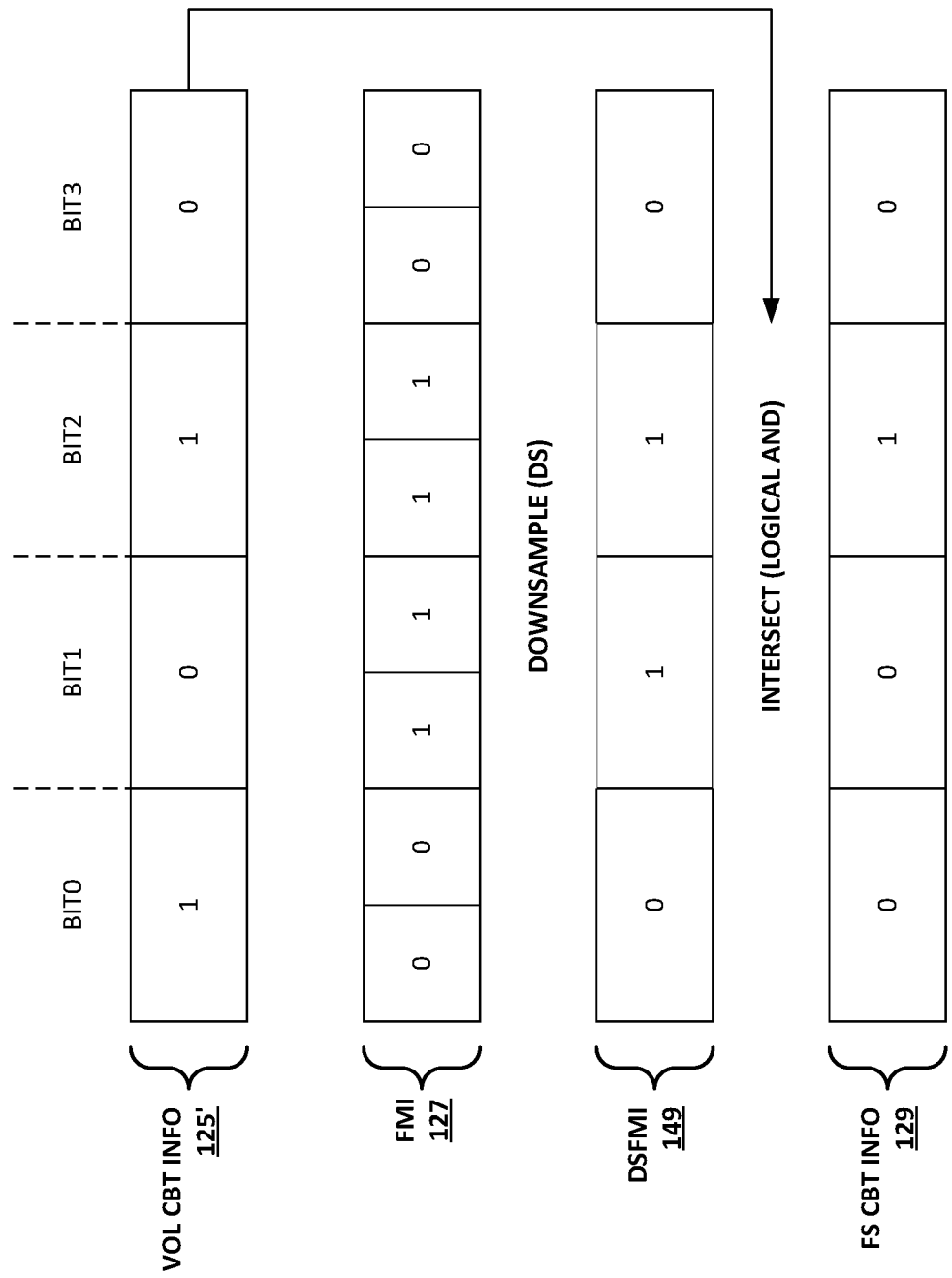
FIG. 5 is a conceptual diagram further illustrating example operation of changed block tracking (CBT) driver shown in the examples of FIGS. 1A-2 in performing file system CBT in a manner that leverages volume CBT in accordance with various aspects of the techniques described in this disclosure.

FIG. 5 is a conceptual diagram further illustrating example operation of changed block tracking (CBT) driver shown in the examples of FIGS. 1A-2 in performing file system CBT in a manner that leverages volume CBT in accordance with various aspects of the techniques described in this disclosure. Similar to the example described above with respect to FIG. 4, CBT driver 124 may obtain volume CBT bitmap 125' and file mapping bitmap 127, except volume CBT bitmap 125' is different than volume CBT bitmap 125 in that volume CBT bitmap 125' is defined in a different (lower) granularity than volume CBT bitmap 125.

Given that volume CBT bitmap 125' has a lower granularity than file mapping bitmap 127, CBT driver 124 may downsample (DS) file mapping bitmap 127 to produce downsampled (DS) file mapping bitmap 149 (which may also be referred to as downsampled (DS) file mapping information (FMI) 149—DSFMI 149) having the same granularity of volume CBT bitmap 125'. CBT driver 124 may obtain FS CBT bitmap 129 as a bitwise logical AND of volume CBT bitmap 125 and DS file mapping bitmap 149.

Figure 6:
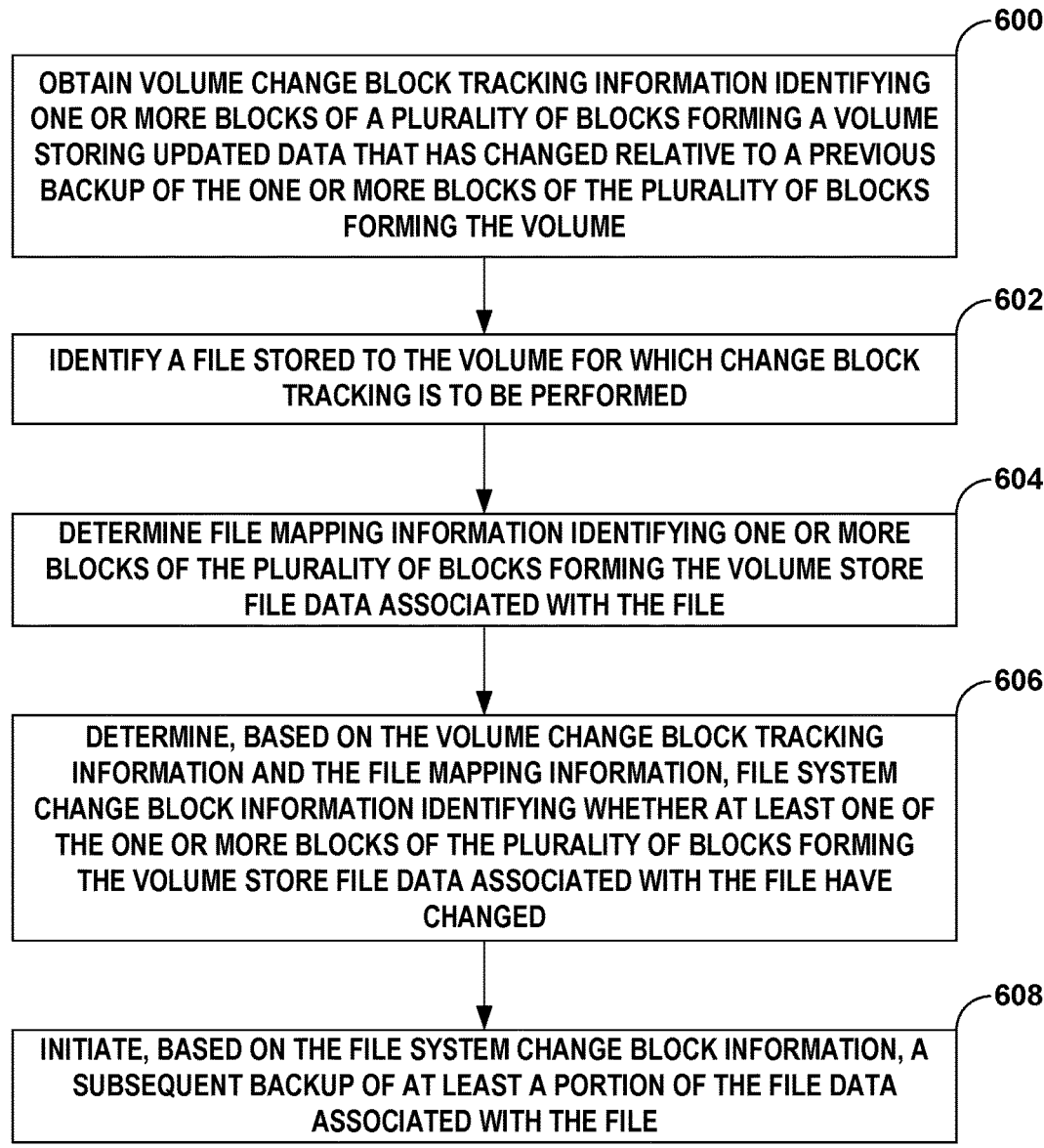
FIG. 6 is a flowchart illustrating example operation of data management module shown in the example of FIGS. 1A-2 in accordance with various aspects of the CBT techniques described in this disclosure.

FIG. 6 is a flowchart illustrating example operation of data management module shown in the example of FIGS. 1A-2 in accordance with various aspects of the CBT techniques described in this disclosure. Data management module 120 may obtain volume changed block tracking information 125 identifying one or more blocks of a plurality of blocks forming a volume stored to a storage device coupled to application server 170M store updated data that has changed relative to a previous backup of the one or more blocks of the plurality of blocks forming the volume (600). Data management module 120 may next identify a file stored to the volume for which changed block tracking is to be performed (602), and determine file mapping information 125 identifying one or more blocks of the plurality of blocks forming the volume store file data associated with the file (604). Data management module 120 may then determine, based on volume changed block tracking information 125 and file mapping information 127, file system changed block information 129 identifying whether at least one of the one or more blocks of the plurality of blocks forming the volume store file data associated with the file have changed (606). Data management module 120 may initiate, based on file system changed block information 129, a subsequent backup of at least a portion of the file data associated with the file (608).

Although the techniques described in this disclosure are primarily described with respect to a backup function performed by an agent of a data platform, similar techniques may additionally or alternatively be applied for a backup, replica, clone, or snapshot functions performed by the data platform. In such cases, archives 142 would be backups, replicas, clones, or snapshots, respectively.

In this way, the CBT driver may lose track of the CBT information once all open handles to the file are closed and the corresponding File Object is destroyed. For example, for SQL DB level backups, FSCBT driver loses track of changes when DB is detached and more commonly across SQL Server reboots. The CBT driver supports incremental backup across reboots. However, the following reasons may be more justifiable: 1) On a system where user has both Volume level incremental backup use case and File Level incremental backup use case, there is an IO performance penalty by having two different drivers in the IO path. It may be beneficial for one driver to solve both use cases. 2) Software Development Life Cycle (SDLC) costs for 2 drivers vs 1 driver. 3) Tracking file level CBT on multiple files on a volume can be costlier than tracking CBT information for the whole volume in terms of: a) Memory footprint needed to track the CBT information because there will be additional metadata for each file tracked; and b) Processing file metadata information (e.g., a file name may need to be translated to a normalized path so that all access mechanisms to that path lead to the IOs being tracked).

For each file level backup:
1) Send the requisite IOCTLs (SnapshotBegin, GetBitmap, SnapshotComplete) to the Volume CBT driver;
2) When incremental file level backup is needed:
   a) Get the Volume CBT Driver's change-block-bitmap.
   b) On the Snapshot Volume, find the file's layout. For example, on NTFS, this can be done using FSCTL_GET_RETRIEVAL_POINTERS and FSCTL_GET_RETRIEVAL_POINTER_BASE
   c) Create a bitmap using the file layout information.
   d) Bring the file layout bitmap to the same granularity as the Volume CBT bitmap (by either upsampling or downsampling the file layout bitmap). This may achieve more optimization in finding the amount of data that has to be read. By "upsampling" and "downsampling," what is implied is as follows- Volume CBT Driver is tracking changes at 4K granularity/blocksize and filesystem gives file layout information at 8K granularity. Then the file layout bitmap is converted into a bitmap that represents data at 4K granularity. Similarly, if the file layout info was at 2K granularity, then convert this into a bitmap that represents the layout at 4K granularity.
   e) Intersect these 2 bitmaps to find the changed blocks for the file.
3) For data consistency, snapshots will be used (so that upon querying the file layout information, the file layout is not changing OR the file content does not change when data is read from the file, etc.).

In this respect, various aspects of the techniques may enable the following examples.

Example 1. A method comprising: obtaining, by processing circuitry of a computing device, volume changed block tracking information identifying one or more blocks of a plurality of blocks forming a volume of a storage device storing updated data that has changed relative to a previous backup of the one or more blocks of the plurality of blocks forming the volume; determining, by the processing circuitry, file mapping information identifying one or more blocks of the plurality of blocks forming the volume store file data associated with a file; determining, by the processing circuitry and based on the volume changed block tracking information and the file mapping information, file system changed block tracking information indicating whether at least one of the one or more blocks of the plurality of blocks forming the volume store file data associated with the file have changed; and initiating, by the processing circuitry and based on the file system changed block tracking information, a subsequent backup of at least a portion of the file data associated with the file.

Example 2. The method of example 1, wherein obtaining the volume changed block tracking information comprises obtaining, after rebooting the computing device, the volume changed block tracking information.

Example 3. The method of example 2, wherein the volume changed block tracking information is more resilient to the rebooting of the computing device in terms of accuracy and reliability compared to natively tracking the file system changed block information separate from the volume changed block tracking information.

Example 4. The method of any of examples 1-3, further comprising identifying, by the processing circuitry, the file stored to the volume for which changed block tracking is to be performed.

Example 5. The method of example 4, wherein identifying the file stored to the volume for which changed block tracking is to be performed comprises receiving an indication, via a user interface, identifying the file stored to the volume for which changed block tracking is to be performed.

Example 6. The method of any of examples 1-5, wherein determining file mapping information comprises interfacing with an application programming interface presented by a file system manager that manages a file system mapped to the volume stored to the storage device to obtain file mapping information identifying the one or more blocks of the plurality of the blocks forming the volume store the file data associated with the file.

Example 7. The method of example 6, wherein the file has a plurality of paths by which to access the file, and wherein determining the file mapping information further comprises: translating the plurality of paths by which to access the file into a common file name; and interfacing with the application programming interface to pass the common file name to obtain the file mapping information.

Example 8. The method of any of examples 1-7, wherein the volume changed block tracking information comprises a volume changed block tracking bitmap, wherein the file mapping information comprises a file mapping bitmap having a higher granularity than the volume changed block tracking bitmap, and wherein determining the file system changed block information comprises downsampling the file mapping bitmap to have a same granularity as the volume changed block tracking bitmap.

Example 9. The method of any of examples 1-8, wherein the volume changed block tracking information comprises a volume changed block tracking bitmap, wherein the file mapping information comprises a file mapping bitmap having a lower granularity than the volume changed block tracking bitmap, and wherein determining the file system changed block information comprises upsampling the file mapping bitmap to have a same granularity as the volume changed block tracking bitmap. Example 10. The method of any of examples 1-9, wherein initiating the subsequent backup comprises: executing, by the processing circuitry, a local agent installed on the computing device that interfaces with a remote data platform to initiate the subsequent backup of at least the portion of the file data associated with the file to the remote data platform.

Example 11. The method of any of examples 1-10, wherein the file system changed block information comprises a file system changed block bitmap identifying whether at least one of the one or more blocks of the plurality of blocks forming the volume store file data associated with the file have changed.

Example 12. A computing device comprising: a storage device having a plurality of blocks forming a volume; and processing circuitry having access to the storage device and configured to: obtain volume changed block tracking information identifying one or more blocks of the plurality of blocks forming the volume storing updated data that has changed relative to a previous backup of the one or more blocks of the plurality of blocks forming the volume; determine file mapping information identifying one or more blocks of the plurality of blocks forming the volume store file data associated with a file; determine, based on the volume changed block tracking information and the file mapping information, file system changed block tracking information identifying whether at least one of the one or more blocks of the plurality of blocks forming the volume store file data associated with the file have changed; and initiate, based on the file system changed block tracking information, a subsequent backup of at least a portion of the file data associated with the file.

Example 13. The computing device of example 12, wherein to obtain the volume changed block tracking information, the processing circuitry is further configured to obtain, after rebooting the computing device, the volume changed block tracking information.

Example 14. The computing device of example 13, wherein the volume changed block tracking information is more resilient to the rebooting of the computing device in terms of accuracy and reliability compared to natively tracking the file system changed block information separate from the volume changed block tracking information.

Example 15. The computing device of any of examples 12-14, wherein the processing circuitry is further configured to identify the file stored to the volume for which changed block tracking is to be performed.

Example 16. The computing device of example 15, wherein to identify the file stored to the volume for which changed block tracking is to be performed, the processing circuitry is configured to receive an indication, via a user interface, identifying the file stored to the volume for which changed block tracking is to be performed.

Example 17. The computing device of any of examples 12-16, wherein to determine file mapping information, the processing circuitry is configured to interfacing with an application programming interface presented by a file system manager that manages a file system mapped to the volume stored to the storage device to obtain file mapping information identifying the one or more blocks of the plurality of the blocks forming the volume store the file data associated with the file.

Example 18. The computing device of example 17, wherein the file has a plurality of paths by which to access the file, and wherein to determine the file mapping information, the processing circuitry is configured to: translate the plurality of paths by which to access the file into a common file name; and interface with the application programming interface to pass the common file name to obtain the file mapping information.

Example 19. The computing device of any of examples 12-18, wherein the volume changed block tracking information comprises a volume changed block tracking bitmap, wherein the file mapping information comprises a file mapping bitmap having a higher or lower granularity than the volume changed block tracking bitmap, wherein to determine the file system changed block information, the processing circuitry is configured to downsample or upsample the file mapping bitmap to have a same granularity as the volume changed block tracking bitmap.

Example 20. A computer-readable storage medium comprising instructions that, when executed, configure processing circuitry of a computing system to: obtain volume changed block tracking information identifying one or more blocks of a plurality of blocks forming a volume storing updated data that has changed relative to a previous backup of the one or more blocks of the plurality of blocks forming the volume; determine file mapping information identifying one or more blocks of the plurality of blocks forming the volume store file data associated with a file; determine, based on the volume changed block tracking information and the file mapping information, file system changed block tracking information identifying whether at least one of the one or more blocks of the plurality of blocks forming the volume store file data associated with the file have changed; and initiate, based on the file system changed block tracking information, a subsequent backup of at least a portion of the file data associated with the file.

For processes, apparatuses, and other examples or illustrations described herein, including in any flowcharts or flow diagrams, certain operations, acts, steps, or events included in any of the techniques described herein can be performed in a different sequence, may be added, merged, or left out altogether (e.g., not all described acts or events are necessary for the practice of the techniques). Moreover, in certain examples, operations, acts, steps, or events may be performed concurrently, e.g., through multi-threaded processing, interrupt processing, or multiple processors, rather than sequentially. Further certain operations, acts, steps, or events may be performed automatically even if not specifically identified as being performed automatically. Also, certain operations, acts, steps, or events described as being performed automatically may be alternatively not performed automatically, but rather, such operations, acts, steps, or events may be, in some examples, performed in response to input or another event.

The detailed description set forth herein, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

In accordance with one or more aspects of this disclosure, the term "or" may be interrupted as "and/or" where context does not dictate otherwise. Additionally, while phrases such as "one or more" or "at least one" or the like may have been used in some instances but not others; those instances where such language was not used may be interpreted to have such a meaning implied where context does not dictate otherwise.

In one or more examples, the functions described may be implemented in hardware, software, firmware, or any combination thereof. If implemented in software, the functions may be stored, as one or more instructions or code, on and/or transmitted over a computer-readable medium and executed by a hardware-based processing unit. Computer-readable media may include computer-readable storage media, which corresponds to a tangible medium such as data storage media, or communication media including any medium that facilitates transfer of a computer program from one place to another (e.g., pursuant to a communication protocol). In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can include RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the terms "processor" or "processing circuitry" as used herein may each refer to any of the foregoing structure or any other structure suitable for implementation of the techniques described. In addition, in some examples, the functionality described may be provided within dedicated hardware and/or software modules. Also, the techniques could be fully implemented in one or more circuits or logic elements.

The techniques of this disclosure may be implemented in a wide variety of devices or apparatuses, including a wireless handset, a mobile or non-mobile computing device, a wearable or non-wearable computing device, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperating hardware units, including one or more processors as described above, in conjunction with suitable software and/or firmware.

The invention claimed is:

1. A method comprising:
obtaining, by processing circuitry of a computing device and after rebooting the computing device, volume changed block tracking information identifying one or more blocks of a plurality of blocks forming a volume of a storage device storing updated data that has changed relative to a previous backup of the one or more blocks of the plurality of blocks forming the volume, wherein the volume changed block tracking information is more resilient to the rebooting of the computing device in terms of accuracy and reliability compared to natively tracking the file system changed block information separate from the volume changed block tracking information;

determining, by the processing circuitry, file mapping information identifying one or more blocks of the plurality of blocks forming the volume that stores file data associated with a file;

determining, by the processing circuitry and based on the volume changed block tracking information and the file mapping information, file system changed block tracking information indicating whether at least one of the one or more blocks of the plurality of blocks forming the volume that stores the file data associated with the file have changed; and sending a message that includes the file system changed block tracking information, by the processing circuitry, and to a separate and remote data platform, to initiate, based on the file system changed block tracking information, a subsequent backup of at least a portion of the file data associated with the file.

2. The method of claim 1, further comprising identifying, by the processing circuitry, the file stored to the volume for which changed block tracking is to be performed.

3. The method of claim 2, wherein identifying the file stored to the volume for which changed block tracking is to be performed comprises receiving an indication, via a user interface, identifying the file stored to the volume for which changed block tracking is to be performed.

4. The method of claim 1, wherein determining file mapping information comprises interfacing with an application programming interface presented by a file system manager that manages a file system mapped to the volume stored to the storage device to obtain file mapping information identifying the one or more blocks of the plurality of the blocks forming the volume store the file data associated with the file.

5. The method of claim 4,
wherein the file has a plurality of paths by which to access the file, and
wherein determining the file mapping information further comprises:
translating the plurality of paths by which to access the file into a common file name; and
interfacing with the application programming interface to pass the common file name to obtain the file mapping information.

6. The method of claim 1,
wherein the volume changed block tracking information comprises a volume changed block tracking bitmap,
wherein the file mapping information comprises a file mapping bitmap having a higher granularity than the volume changed block tracking bitmap, and
wherein determining the file system changed block tracking information comprises down sampling the file mapping bitmap to have a same granularity as the volume changed block tracking bitmap.

7. The method of claim 1,
wherein the volume changed block tracking information comprises a volume changed block tracking bitmap, wherein the file mapping information comprises a file mapping bitmap having a lower granularity than the volume changed block tracking bitmap, and wherein determining the file system changed block tracking information comprises up sampling the file mapping bitmap to have a same granularity as the volume changed block tracking bitmap.

8. The method of claim 1, wherein sending the message to initiate the subsequent backup comprises executing, by the processing circuitry, a local agent installed on the computing device that sends the message to the separate and remote data platform to initiate the subsequent backup of at least the portion of the file data associated with the file to the remote data platform.

9. The method of claim 1, wherein the file system changed block tracking information comprises a file system changed block bitmap identifying whether at least one of the one or more blocks of the plurality of blocks forming the volume that stores the file data associated with the file have changed.

10. A computing device comprising:
a storage device having a plurality of blocks forming a volume; and
processing circuitry having access to the storage device and configured to:
obtain, after rebooting the computing device, volume changed block tracking information identifying one or more blocks of the plurality of blocks forming the volume storing updated data that has changed relative to a previous backup of the one or more blocks of the plurality of blocks forming the volume, wherein the volume changed block tracking information is more resilient to the rebooting of the computing device in terms of accuracy and reliability compared to natively tracking the file system changed block information separate from the volume changed block tracking information;
determine file mapping information identifying one or more blocks of the plurality of blocks forming the volume that stores file data associated with a file;
determine, based on the volume changed block tracking information and the file mapping information, file system changed block tracking information identifying whether at least one of the one or more blocks of the plurality of blocks forming the volume that stores the file data associated with the file have changed; and
send a message that includes the file system changed block tracking information, to a separate and remote data platform, to initiate, based on the file system changed block tracking information, a subsequent backup of at least a portion of the file data associated with the file.

11. The computing device of claim 10, wherein the processing circuitry is further configured to identify the file stored to the volume for which changed block tracking is to be performed.

12. The computing device of claim 11, wherein to identify the file stored to the volume for which changed block tracking is to be performed, the processing circuitry is configured to receive an indication, via a user interface, identifying the file stored to the volume for which changed block tracking is to be performed.

13. The computing device of claim 10, wherein to determine the file mapping information, the processing circuitry is configured to interface with an application programming interface presented by a file system manager that manages a file system mapped to the volume stored to the storage device to obtain the file mapping information identifying the one or more blocks of the plurality of the blocks forming the volume that stores the file data associated with the file.

14. The computing device of claim 13,
wherein the file has a plurality of paths by which to access the file, and
wherein to determine the file mapping information, the processing circuitry is configured to:
translate the plurality of paths by which to access the file into a common file name; and
interface with the application programming interface to pass the common file name to obtain the file mapping information.

15. The computing device of claim 10,
wherein the volume changed block tracking information comprises a volume changed block tracking bitmap,
wherein the file mapping information comprises a file mapping bitmap having a higher or lower granularity than the volume changed block tracking bitmap, and
wherein to determine the file system changed block tracking information, the processing circuitry is configured to down sample or up sample the file mapping bitmap to have a same granularity as the volume changed block tracking bitmap.

16. A computer-readable storage medium comprising instructions that, when executed, configure processing circuitry of a computing system to:
obtain, after rebooting the computing system, volume changed block tracking information identifying one or more blocks of a plurality of blocks forming the volume storing updated data that has changed relative to a previous backup of the one or more blocks of the plurality of blocks forming the volume, wherein the volume changed block tracking information is more resilient to the rebooting of the computing system in terms of accuracy and reliability compared to natively tracking the file system changed block information separate from the volume changed block tracking information;
determine file mapping information identifying one or more blocks of the plurality of blocks forming the volume that stores file data associated with a file;
determine, based on the volume changed block tracking information and the file mapping information, file system changed block tracking information identifying whether at least one of the one or more blocks of the plurality of blocks forming the volume that stores the file data associated with the file have changed; and
send a message that includes the file system changed block tracking information, to a separate and remote data platform, to initiate, based on the file system changed block tracking information, a subsequent backup of at least a portion of the file data associated with the file.

* * * * *